Figure 1:
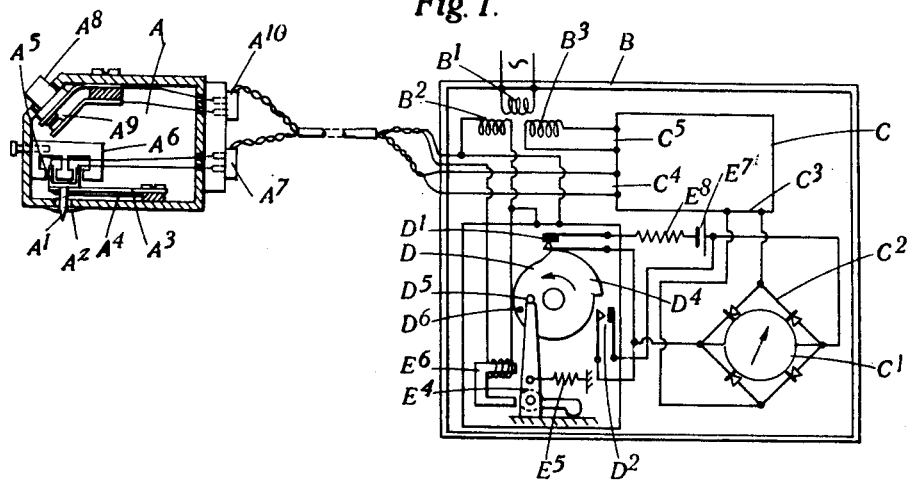

March 14, 1944.  R. E. REASON ET AL  2,344,217
APPARATUS FOR MEASURING SURFACE ROUGHNESS
Filed Feb. 13, 1941  4 Sheets-Sheet 1

Inventors
Richard Edmond Reason
and Raymond Ivan Garrod
by Blair + Kilcoyne
Attorneys March 14, 1944.  R. E. REASON ET AL  2,344,217
APPARATUS FOR MEASURING SURFACE ROUGHNESS
Filed Feb. 13, 1941  4 Sheets-Sheet 2

Inventors
Richard Edmond Reason
and Raymond Ivan Garrod
by
Blair & Kilcoyne
Attorneys March 14, 1944.  R. E. REASON ET AL  2,344,217
APPARATUS FOR MEASURING SURFACE ROUGHNESS
Filed Feb. 13, 1941  4 Sheets-Sheet 4
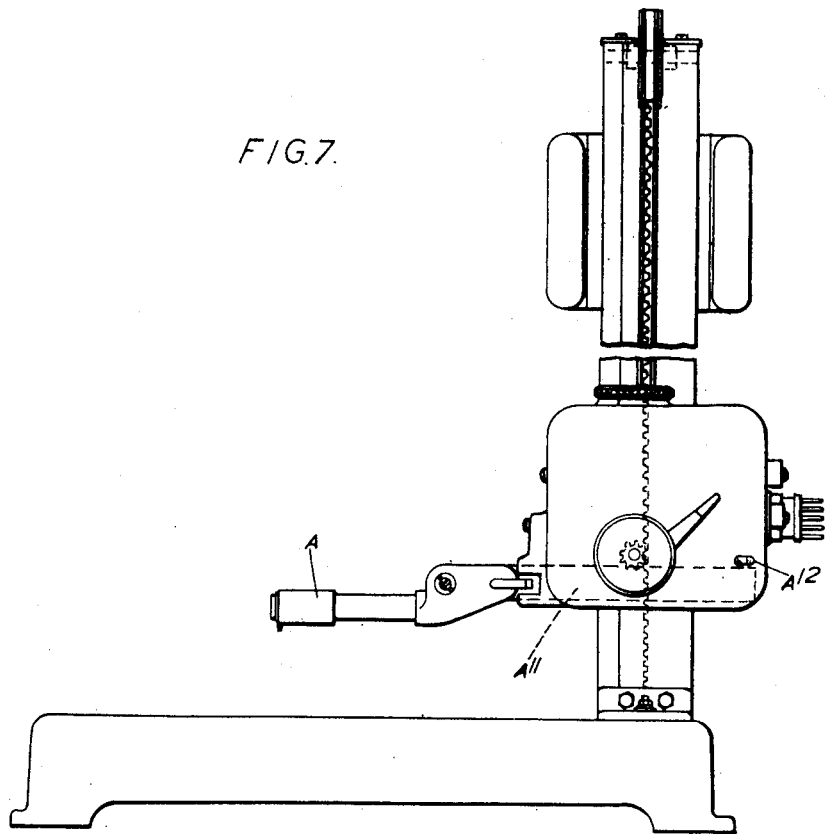
FIG.7.
FIG.8.
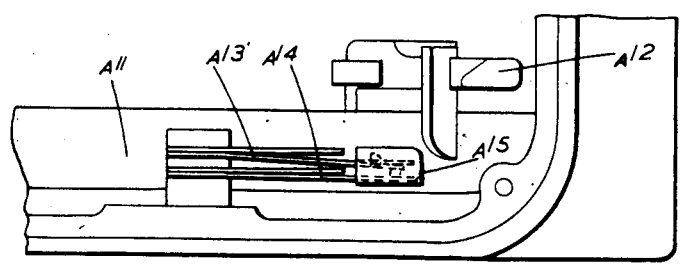
Inventors
R.E. REASON.
By R.I. GARROD.
Emery, Holcombe & Shaw
Attorneys Patented Mar. 14, 1944

2,344,217

UNITED STATES PATENT OFFICE 2,344,217

APPARATUS FOR MEASURING SURFACE ROUGHNESS

Richard Edmund Reason and Raymond Ivan Garrod, Leicester, England, assignors to Kapella Limited, Leicester, England, a company of Great Britain Application February 13, 1941, Serial No. 378,836
In Great Britain February 1, 1940

20 Claims. (Cl. 73—51)

This invention relates to the measurement of surface roughness, for example, in order to check the uniformity of surfaces and to determine, for instance, whether a surface is sufficiently smooth for a predetermined purpose.

In some instances it is desirable for the measuring apparatus to provide information not only as to the average degree of roughness of a surface but also as to the peak value of the roughness and/or the actual wave form thereof and when such complete information is required, the measuring apparatus may be of the form described and claimed in the specification of our copending United States of America Patent application Serial No. 381,920, filed March 5, 1941. In many cases, however, it will be sufficient for the measuring apparatus to provide an indication of the average roughness or of the proportion of the total surface which lies within predetermined limits of smoothness and the main objects of the present invention are to provide an improved method of obtaining such measurement and simple measuring apparatus which is easy to manipulate and can readily be used under workshop conditions.

The improved method of measuring surface roughness according to this invention comprises traversing across the surface a stylus associated with a pick-up device for producing or controlling an electrical quantity so that such quantity has a value which depends on movements of the stylus in a direction normal or substantially normal to the surface, and integrating the electrical quantity derived from the pick-up device or a function of that quantity for a predetermined time whereby an indication and/or a record representative of a time-integral of movements of the stylus normal to the surface is obtained.

The electrical quantity may be so produced or controlled that it has a value which varies in accordance with the movements of the stylus normal or substantially normal to the surface so that an integrating meter or other instrument gives an indication and/or a record of the time integral of such movements.

It is to be understood that the term "electrical quantity" as used above and in the following description, is intended to include quantities such as electric current, voltage or power, having an instantaneous value which can be representative of the movement to be measured.

According to the invention apparatus for measuring the roughness of a surface comprises a stylus for engaging the surface, means for traversing the stylus across the surface, a pick-up device associated with the stylus for producing or controlling an electrical quantity so that such quantity depends on movements of the stylus in a direction normal or substantially normal to the surface, and a meter or other instrument so actuated or controlled by the electrical quantity derived from the pick-up device as to be influenced by an integral of such quantity, or a function thereof, for a predetermined time interval, the arrangement being such as to provide an indication and/or a record representative of integrated movements of the stylus normal to the surface during such time interval.

In one convenient arrangement the quantity controlled by the stylus varies in accordance with the movements of the stylus normal or substantially normal to the surface and such quantity, or a quantity representative thereof, is supplied to an integrating meter. In this arrangement the stylus may be traversed across the surface at a known speed which may be constant. The meter may then be so controlled that it is influenced by the electrical quantity derived from the pick-up device during a traversing movement of a predetermined length, the meter preferably being rendered effective after the traversing movement has commenced and being rendered ineffective before such traversing movement is completed. Alternatively the meter may be rendered effective and ineffective under the control of a time switch.

When the meter is rendered effective during a predetermined time the traversing means for the stylus may control two sets of contacts of which the contacts of one set are operated after the traversing movement has been initiated and act to render the meter responsive to the stylus-controlled quantity whilst the contacts of the second set are operated after a predetermined time and act to maintain the meter indication at the value reached at the end of such movement. Preferably an ampere-seconds meter is used as the integrating meter and is normally held at zero by a reverse current flowing therethrough, contacts controlled by the traversing movement of the pick-up unit being operative first to open the reverse-current circuit when the pick-up reaches a predetermined position on the surface and then, after a predetermined time, to short-circuit the meter.

Any suitable form of pick-up device may be used. Thus for example, the device may be of the so-called self-generating type capable of producing a voltage dependent on the movements of the stylus, the voltage being amplified (if necessary) and supplied to the integrating meter. When, as is usual, a D. C. meter is used the output of the amplifier is rectified before being supplied to the meter. Examples of such pick-up devices are electro-magnetic, electro-dynamic and piezo-electric pick-up devices.

Instead of using a pick-up device of the self-generating type, an electro-dynamic or electrostatic pick-up may be used and arranged to control or modulate the output from an A. C. source having a frequency which is high as compared with the principal frequencies in the movements of the stylus normal to the surface, the modulated output being amplified, demodulated and supplied to an A. C. meter or, after rectification, to a D. C. integrating meter. The arrangement for deriving an electrical quantity representative of the movements of the stylus normal to the surface is then similar to those described in the specifications of the concurrent applications referred to above and, as in those arrangements, an electro-magnetic pick-up of the differential type is preferably used, the arrangement being such that the output is obtained from a small difference between two relatively large quantities derived from the A. C. source, at least one of such quantities being varied by movements of the stylus normal to the surface.

The integrating meter may be of any suitable type but preferably comprises a D. C. milliameter which is heavily damped and from which the returning spring has been removed so that the meter reading is, at any instant after it has been energized, representative of the product of current and time. If desired, however, a D. C. electrolytic integrating meter may be employed or the meter may, whether D. C. or A. C., be of the motor type or, if A. C., of the induction disc type. Whatever type of meter is used, it may be arranged to give an indication or a record or both.

Figure 4:
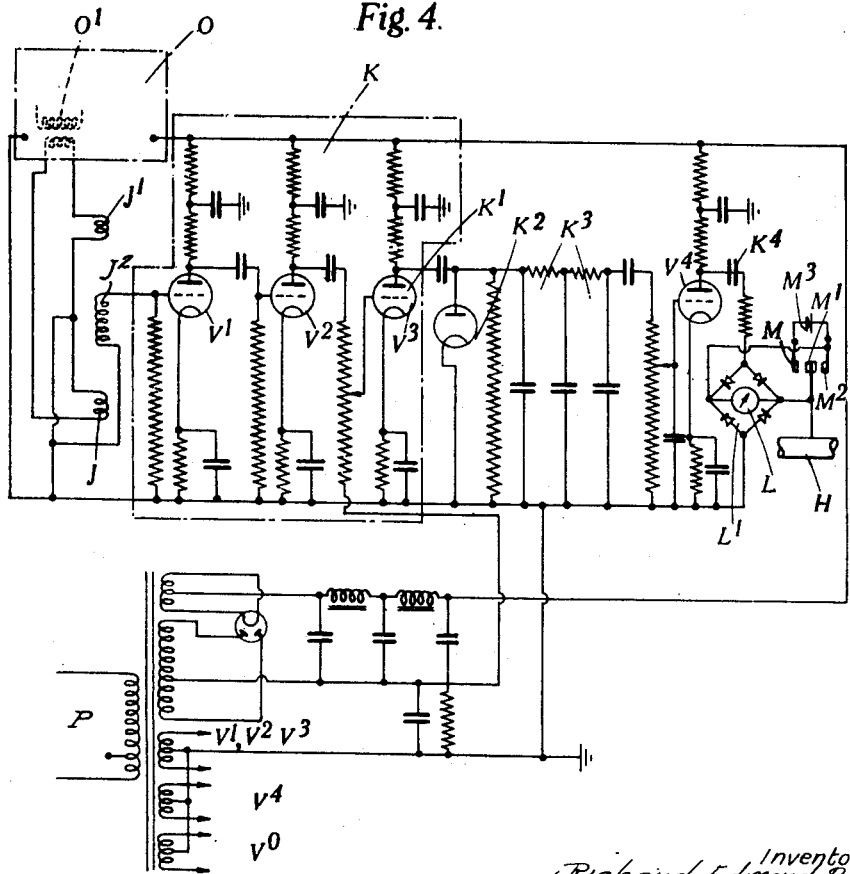
Figure 2:
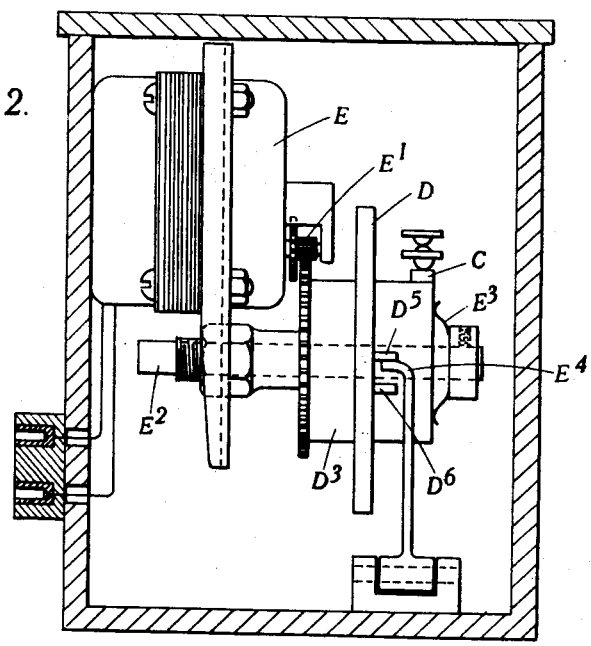
Figure 3:
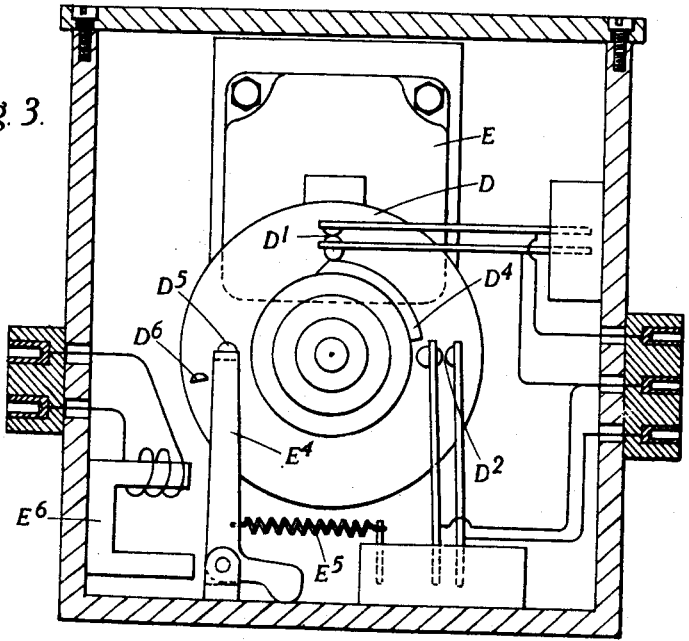
Figure 5:
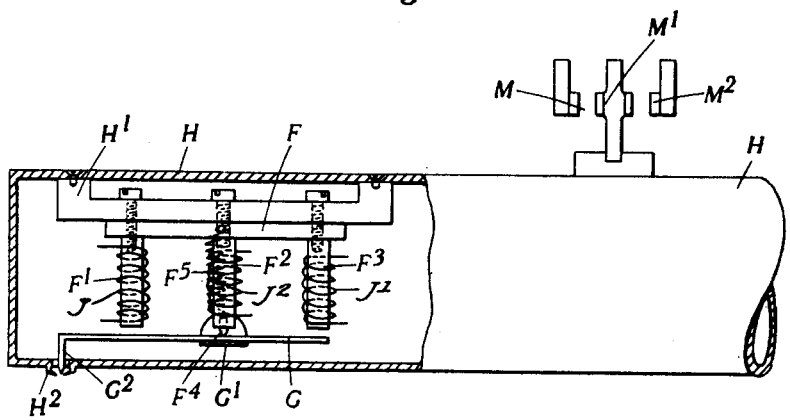
Figure 6:
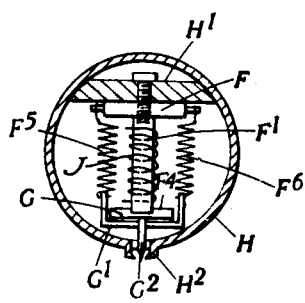

The invention may be carried into practice in a variety of ways and two convenient arrangements in accordance therewith will now be described, by way of example, with reference to the accompanying drawings, in which Figure 1 is a wiring diagram of one arrangement, Figures 2 and 3 are, respectively, sectional side and front elevations of part of the apparatus in the arrangement shown in Figure 1, Figure 4 is a wiring diagram of the second arrangement, and Figures 5 and 6 are, respectively, diagrammatic sectional side and end elevations of part of the apparatus in the arrangement shown in Figure 4, Fig. 7 is a front elevation of one construction of mounting and traversing unit for the pick-up; and Fig. 8 is a detailed view of part of the unit shown in Fig. 7.

The simple arrangement shown in Figures 1–3 has a self-generating pick-up A which may be of the electromagnetic or piezo-electric type and is shown in Figure 1 as of the moving coil electromagnet type. The pick-up has a needle or other stylus $A^1$ for traversing the surface to be investigated, projecting downwardly through a so-called "presser foot" or skid $A^2$ which engages the surface and should be sufficiently large to rest on several "crests" of roughness and thus provide a datum line relatively to the point of the stylus. The needle $A'$ is mounted at one end of a springy arm $A^3$ provided with stiffening ribs $A^4$ and carries a moving coil $A^5$ which projects into the air gap of a pot-like electromagnet $A^6$. The moving coil is connected to a pair of plug sockets $A^7$ supported on insulated block secured to the pick-up casing. In the arrangement shown the pick-up is intended to be traversed over the surface by hand but it can, if desired, be mounted on a traversing arm or the like operated by any suitable drive, for example in the manner described in the specifications of copending United States of America Patent application Serial No. 379,536, filed February 18, 1941.

In the construction of traversing unit shown in Figs. 7 and 8, which is similar to that described in the above-mentioned co-pending application Serial No. 379,536, the pick-up A is mounted on the end of a traversing arm $A^{11}$ of an adjustable stand so that it can be fixed in any desired position relatively to the specimen to be examined, this specimen being mounted on the platform of the stand. The arm $A^{11}$ is traversed by suitable mechanism which since details thereof form no part of the present invention and the mechanism is fully described in the specification of the aforesaid application Serial No. 379,536, will not be described in detail in the present specification. The traversing mechanism is provided with a starting switch $A^{12}$ following operation of which the arm $A^{11}$ is moved longitudinally to cause the stylus to travel over the surface to be investigated.

The remainder of the apparatus is mounted within a box B and comprises a main transformer having a primary winding $B^1$ for connection to alternating current supply mains and two secondary windings $B^2$ and $B^3$, a thermionic amplifier C complete with a main energizing unit energized from the secondary winding $B^3$ of the transformer, an integrating meter $C^1$ connected in a rectifier bridge circuit $C^2$ and energized from the output terminals $C^3$ of the amplifier, and a time switch (shown in detail in Figures 2 and 3) having a cam D for operating two sets of contacts $D^1$ and $D^2$. As the amplifier C with its mains unit is of well-known construction, for example of the resistance-capacity coupled type such as is used in wireless receivers, it is unnecessary to describe it in detail and it is illustrated in Figure 1 by a rectangle having output terminals $C^3$, input terminals $C^4$ and mains supply terminals $C^5$.

The time switch, as shown in Figures 2 and 3, comprises a small electric motor E (such as is used in press-button tuning apparatus for wireless sets) driving, through step-down gearing $E^1$, a spindle $E^2$, the gearing being such that the spindle $E^2$ rotates about once per second. The motor is energized from the transformer winding $B^2$ so as to run continuously when the apparatus is in use. The spindle $E^2$ drives the cam D which is mounted on a hub $D^3$ free to rotate on the spindle but connected thereto by a friction coupling consisting of a spring $E^3$. The cam D comprises a plate having a raised portion $D^4$ extending around approximately a quarter of its periphery. Projecting from the surface of the plate D are two catch pins $D^5$ and $D^6$ which cooperate with a pivoted detent $E^4$ normally maintained in the position shown in Figure 3 by a spring $E^5$ but capable of being actuated to a position such that it is clear of the pin $D^5$ and in the path of the catch pin $D^6$ by an electromagnet $E^6$. The magnet $E^6$ is energized from the transformer under the control of a switch actuated by a push button switch $A^9$ on the pick-up head, the switch contacts being connected to plug sockets $A^{10}$. The cam actuates the two sets of contacts $D^1$ and $D^2$, the contacts $D^1$ being closed in the normal inoperative position of the cam, in which rotation thereof (in a counter-clockwise direction as viewed in Figure 3) is prevented by the catch pin $D^5$ and detent $E^4$, to complete a restoring circuit including a battery $E^7$ and a current limiting resistance $E^5$ for supplying reverse current to the meter which is thus maintained at zero.

When the pick-up is traversed over the surface under investigation the switch $A^8$ is closed so that the magnet $E^6$ is energized, the detent then moves to the left (Figure 3) and the cam rotates. After about ¼ turn the contacts $D^1$ open and the meter is supplied with current from the output terminals $C^3$ of the amplifier. When the cam has completed about ¾ turn the contacts $D^2$ close thereby short-circuiting the meter. The meter reading is then observed and the switch $A^8$ released so that the detent $E^5$ returns to its normal position thereby releasing the cam which rotates to open contacts $D^2$ and close contacts $D^1$. The meter is thus restored to its zero position by the reverse current. The meter preferably consists of a D. C. milliammeter having negligible restoring force and heavily damped (such an instrument being generally known as a flux meter) so that the final reading is representative of a time integral of the movements of the stylus normal to the surface.

When the contacts $D^2$ close the meter pointer remains stationary in the position it has reached and the scale reading is representative of the integral of the amplifier output over the length of surface traversed between the operation of the two sets of contacts and can be calibrated directly to read average roughness.

Although it is usually preferable for the stylus to be traversed at constant or substantially constant speed, the speed of traverse (or variations thereof) do not appreciably affect the calibration of the meter as, provided that the time is constant and the frequency limits of the apparatus are not exceeded, a change in speed is only equivalent to a change in the pitch of the undulations without changing their mean amplitude which is the quantity measured.

If desired the measurement of the average roughness by means of an integrating meter may be used instead of the average meter in measuring apparatus of the kind described in the copending United States of America Patent Application Serial No. 381,920, filed March 5, 1941, referred to above. One suitable arrangement of this type is shown diagrammatically in Figures 4–6 and will now be described.

In such an arrangement a differential pick-up of the electromagnetic type, one form of which is shown in Figures 5 and 6 and will be more fully described below, is arranged to control the amplitude of a carrier current derived from an A. C. source conveniently consisting of a thermionic valve oscillator which, as the construction thereof is well known, is indicated by a chain-like rectangle O in Figure 4. The source O has a frequency which is high (for example between 3,000 and 30,000 cycles per second) relatively to the principal frequencies in the movements of the stylus normal to the surface.

The differential pick-up comprises, as shown diagrammatically in Figures 5 and 6, a magnetic system consisting of a yoke F having three parallel limbs $F^1$, $F^2$ and $F^3$ arranged side by side so as to form a substantially E-shaped core structure. An armature G disposed at the lower ends of the limbs $F^1$, $F^2$, $F^3$ is pivoted on a knife-edge blade $F^4$ projecting from the centre of the middle limb $F^2$ and is held in position by a pair of springs $F^5$ and $F^6$ attached at their upper ends to the yoke F and at their lower ends to upturned lugs at opposite ends of a non-magnetic cross bar $G^1$ connected to the armature G. The armature carries a stylus $G^2$ which projects through a hole in a tubular casing H of high-permeability iron within which the complete electromagnetic system is mounted so that it is provided with adequate magnetic screening. The yoke F is mounted on a non-magnetic supporting frame $H^1$ which is in turn fastened to the casing H in any convenient manner. The stylus $G^2$ projects downwardly through a "presser foot" or skid $H^2$, preferably adjustably mounted on the casing H in a manner not shown in the figures, the skid $H^2$ being adapted to engage the surface to be investigated and being sufficiently large to rest on several "crests" of roughness so as to provide a datum line relatively to the point of the stylus. The pick-up can be traversed over the surface by hand or in any other convenient manner as, for example, by the mechanism described in the specifications of concurrent United States of America Patent application Serial No. 379,536, filed February 18, 1941.

The core structure F, $F^1$, $F^2$ and $F^3$ constitutes with the armature G two magnetic circuits with the central limb $F^2$ common to both circuits. The two outer limbs $F^1$ and $F^3$ respectively carry primary coils J and $J^1$ whilst the central limb $F^2$ carries a secondary coil $J^2$ (Figure 4). The primary coils J and $J^1$ are energized in series from the secondary coil of the oscillator output transformer $O^1$, the directions of winding of and the current supply to the windings J and $J^1$ being such that the magnetic fluxes in the two magnetic circuits oppose one another in the central limb $F^2$. Thus movements of the armature G about its pivot $F^4$ varies the reluctances of the two magnetic circuits in opposite senses and the output of the secondary coil $J^2$ comprises a current of the frequency of the output of the oscillator O modulated in accordance with the movements of the stylus in a direction normal to the surface, the amount of the modulation being increased by the differential action of the arrangement.

The carrier current modulated in this way, with or without backing-off adjustment by control of the percentage modulation in the manner described in the specifications of the above-mentioned concurrent patent applications, is amplified by a thermionic amplifier K having one or more resistance-capacity coupled stages (three stages in the arrangement shown in Figure 4) and the output from the last valve $V^3$ of the amplifier K is rectified by a rectifier $K^2$ and smoothed by smoothing circuits $K^3$. The modulation component thus obtained is supplied to the grid circuit of an amplifying triode $V^4$ having an average meter L capacity-coupled through a condenser $K^4$ to its anode circuit. If desired the meter L can be transformer-coupled to the anode circuit of the valve $V^4$. Energizing potentials for the several components of the system, namely the oscillator O, the multi stage amplifier K, rectifier $K^2$ and final amplifier $V^4$ are derived from a suitable source of alternating power current P feeding the primary winding of a transformer having a plurality of secondary windings energizing a thermionic power rectifier and filter assembly for producing a direct current potential for the plates of the several thermionic tubes as well as the heating circuits of the amplifiers $V^1$, $V^2$, $V^3$, the amplifier $V^4$ and also the heating circuit $V^0$ of the oscillating unit O. Such power supply circuits are well known in the art, any of which may be utilized. When, as is shown in Figure 4, a D. C. meter of the flux meter type is used, the output is rectified by means of a rectifier bridge $L^1$ before being supplied to the meter, the meter L being connected in the diagonal of the bridge. If desired, however, an A. C. integrating meter of the motor or induction disc type can be used, in which case it is directly connected in the output circuit of the triode.

When the pick-up is mounted on a stand such as is shown in Fig. 7, the switch $A^8$ can be omitted and control of the traversing mechanism and of the time switch effected by means of contacts mounted close to the arm $A^{11}$. Thus there may be a pair of spring blade contacts $A^{13}$ and $A^{14}$ (Fig. 8), the contact $A^{14}$ having a lateral upward projection $A^{15}$ extending to approximately the same level as the contact $A^{13}$. When the switch $A^{12}$ is moved to the starting position the contacts are closed by a stud $A^{16}$ on the arm $A^{11}$ thus starting the time switch. The arm then moves longitudinally, to the right as viewed in Fig. 8 and the stud $A^{11}$ slides off the end of the upper contact blade $A^{13}$ which rises and stops the traversing motor.

In addition, it is necessary to provide means for controlling the time interval during which the meter L is energized. Such means comprises switch contacts M, $M^1$ and $M^2$ (as shown in Fig. 5), the contacts M and $M^2$ being carried by the mechanism casing of the stand and, the contact $M^1$ being actuated by a time switch such as shown in Figures 2 and 3 so that, initially, the contact $M^1$ engages the contact M to complete a circuit for reverse current to flow from a battery $M^3$ through the meter L to maintain it at zero, during the traversing movement both contacts are open and at the end of such movement the contact $M^1$ engages the contact $M^2$ so as to short-circuit the meter to ensure that the pointer remains in the position reached and thus can easily be read.

It is to be understood that the above description is by way of example only and that various modifications may be made within the scope of the invention. Thus, for example, whilst in the arrangements described above current integrating meters are used, any other suitable quantity, such as electric power can be supplied to an integrating meter for that quantity, the value of the quantity supplied to the meter being controlled in accordance with the movements of the stylus normal to the surface.

What we claim as our invention and desire to secure by Letters Patent is:

1. Apparatus for measuring the roughness or the degree of roughness of a surface comprising a stylus for engaging the surface, means for traversing the stylus across the surface, a pick-up device associated with the stylus for producing an electrical quantity so that such quantity depends on movements of the stylus in a direction substantially normal to the surface, a direct-reading integrating meter, a time switch, means associated with the pick-up for rendering the time switch operative, and contacts actuated by the time switch for rendering the meter responsive to the electrical quantity derived from the pick-up after the beginning of a traversing movement and for rendering it unresponsive after a predetermined time, the arrangement being such as to provide an indication representative of integrated movements of the stylus normal to the surface during such time interval and therefore of the average roughness of the surface traversed during the predetermined time.

2. Apparatus for measuring the roughness or the degree of roughness of a surface comprising a stylus for engaging the surface, as the stylus is moved across the surface, a pick-up device associated with the stylus for producing an electrical quantity so that such quantity depends on movements of the stylus in a direction substantially normal to the surface, a direct-reading integrating meter, means electrically connecting said pick-up device to said meter, a time switch controlling said meter, and means for initiating the operations of said time switch whereby said meter is energized for a predetermined time in accordance with the electrical quantity derived from said pick-up device during the traversing movement of said stylus, thus giving an indication representative of integrated movements of the stylus normal to the surface during such time interval and therefore of the average roughness of the surface traversed during the predetermined time.

3. Apparatus for measuring the roughness or the degree of roughness of a surface comprising a stylus for engaging the surface, means for traversing the stylus across the surface, means for producing an electrical quantity having a frequency which is high compared with the principal frequencies in the movements of the stylus, a pick-up device associated with the stylus for controlling the electrical quantity so that such quantity depends on movements of the stylus in a direction substantially normal to the surface, a direct-reading integrating meter, means electrically connecting said pick-up device to said meter, a time switch controlling said meter, and means for initiating the operations of said time switch whereby said meter is energized for a predetermined time in accordance with the electrical quantity derived from said pick-up device during the traversing movement of said stylus, thus giving an indication representative of integrated movements of the stylus normal to the surface during such time interval and therefore of the average roughness of the surface traversed during the predetermined time.

4. Apparatus for meauring the roughness or degree of roughness of a surface comprising a stylus for engaging the surface, means for traversing the stylus across the surface at a substantially constant speed, a pick-up device associated with the stylus for producing an electrical quantity so that such quantity depends on movements of the stylus in a direction substantially normal to the surface, a direct-reading integrating meter, means electrically connecting said pick-up device to said meter, a time switch controlling said meter, and means for initiating the operations of said time switch subsequent to the commencement of the traversing movement of the stylus whereby said meter is energized for a predetermined time in accordance with the electrical quantity derived from said pick-up device during the traversing movement of said stylus, thus giving an indication representative of integrated movements of the stylus normal to the surface during such time interval and therefore of the average roughness of the surface traversed during the predetermined time.

5. Apparatus for measuring the average roughness of a surface, comprising an electrical pickup having a stylus for engaging the surface and controlling the electrical output which varies in accordance with movements of said stylus in a direction substantially normal to the surface as the pick-up is moved across the surface, an amplifier for the output of said pick-up, a direct-reading current integrating meter to which the output of the amplifier is supplied for a predetermined time, and a time switch for controlling the extent of said predetermined time and the resulting time-integrated indication of said meter.

6. Apparatus for measuring the average roughness of a surface, comprising an electrical pickup having a stylus for engaging the surface and controlling the electrical output which varies in accordance with movements of said stylus in a direction substantially normal to the surface, means for traversing said pick-up across the surface, an amplifier for the output of said pick-up, means for rectifying the output of said amplifier, a direct-reading current integrating meter for registering the product of current and time comprising a damped direct current meter having a negligible restoring force to which the rectified output of the amplifier is supplied for a predetermined time, and a time switch for controlling the extent of said predetermined time and the resulting time-integrated indication of said meter.

7. An apparatus as set forth in claim 6 wherein the integrating meter is an ampere-seconds meter normally held at zero by a reverse current flowing therethrough, and switch contacts controlled by said time switch for opening the reverse current circuit preparatory to obtaining an indication upon the meter.

8. An apparatus as set forth in claim 6 wherein the integrating meter is an ampere-seconds meter, and switch contacts operated by said time switch for short circuiting said meter at the end of a predetermined time.

9. An apparatus as set forth in claim 2 wherein said time switch comprises a constant speed cam executing a predetermined movement and having switch contacts for energizing said meter and for later denergizing said meter after the predetermined time.

10. An apparatus as set forth in claim 6 wherein said time switch comprises a constant speed cam executing a predetermined movement and having switch contacts for energizing said meter and for later deenergizing said meter after the predetermined time.

11. Apparatus for measuring the average roughness of a surface comprising the combination of a stylus for engaging the surface, an electrical pick-up carrying the stylus, means for traversing the pick-up across the surface, a source of alternating current having a frequency which is high as compared with the principal frequencies in the movements of the stylus normal to the surface, means for so associating the pick-up and the A. C. source that the pick-up modulates the electrical output from the source in accordance with the movements of the stylus normal to the surface, an amplifier for the modulated A. C. output from the source, means for rectifying the amplifier output, an integrating meter to which the rectified output of the amplifier is supplied, a time switch controlling the energization of the meter by the rectified output and means for initiating the operation of the time switch at the beginning of a traversing movement of the pick-up.

12. Apparatus for measuring the average roughness of a surface comprising the combination of a stylus for engaging the surface, an electrical pick-up carrying the stylus, means for traversing the pick-up across the surface, a source of alternating current having a frequency which is high as compared with the principal frequencies in the movements of the stylus normal to the surface, means for so associating the pick-up and the A. C. source that the pick-up modulates the electrical output from the source in accordance with the movements of the stylus normal to the surface, an amplifier for the modulated A. C. output from the source, means for rectifying the amplifier output, an ampere-seconds meter comprising a damped direct current meter with negligible restoring force to which the rectified output from the amplifier is supplied, a time switch controlling the energization of the meter by the rectified output and means for initiating the operation of the time switch at the beginning of a traversing movement of the pick-up.

13. Apparatus for measuring the average roughness of a surface comprising the combination of a stylus for engaging the surface, an electrical pick-up carrying the stylus, means for traversing the pick-up across the surface, a source of alternating current having a frequency which is high as compared with the principal frequencies in the movements of the stylus normal to the surface, means for so associating the pick-up and the A. C. source that the pick-up modulates the electrical output from the source in accordance with the movements of the stylus normal to the surface, an amplifier for the modulated A. C. output from the source means for rectifying the amplifier output, an ampere-seconds meter comprising a damped direct current meter with negligible restoring force to which the rectified output from the amplifier is supplied, a time switch controlling the energization of the meter by the rectified output, means for initiating the operation of the time switch at the beginning of a traversing movement of the pick-up, a source of direct current, means for connecting the said source to the meter so that current flows through the meter in a reverse direction to hold said meter at zero and normally closed contacts included in said connecting means and opened by the time switch after initiation of the operation thereof.

14. The combination with the apparatus claimed in claim 11, of normally open contacts for short-circuiting the meter actuated by the time switch at the end of the predetermined time whereby the meter indication at the end of that time is retained.

15. The combination with the apparatus claimed in claim 13, of normally open contacts for short-circuiting the meter actuated by the time switch at the end of the predetermined time whereby the meter indication at the end of that time is retained.

16. Apparatus for measuring the average roughness of a surface comprising the combination of a stylus for engaging the surface, an electrical pick-up carrying the stylus, means for traversing the pick-up across the surface, a source of alternating current having a frequency which is high as compared with the principal frequencies in the movements of the stylus normal to the surface, means for so associating the pick-up and the A. C. source that the pick-up modulates the electrical output from the source in accordance with the movements of the stylus normal to the surface, an amplifier for the modulated A. C. output from the source, means for rectifying the amplifier output, an integrating meter to which the rectified output of the amplifier is supplied, and a time switch comprising a cam, means for rotating the cam at a constant speed, a first set of contacts operated by the cam at the beginning of its movement for rendering the meter responsive to the output from the pick-up, a second set of contacts operated by the cam at the end of its movement for rendering the meter unresponsive to the output from the pick-up, means for starting rotation of the cam and means for stopping the cam after a predetermined movement.

17. Apparatus for measuring the average roughness of a surface comprising the combination of a stylus for engaging the surface, an electrical pick-up carrying the stylus, means for traversing the pick-up across the surface, a source of alternating current having a frequency which is high as compared with the principal frequencies in the movements of the stylus normal to the surface, means for so associating the pick-up and the A. C. source that the pick-up modulates the electrical output from the source in accordance with the movements of the stylus normal to the surface, an amplifier for the modulated A. C. output from the source, means for rectifying the amplifier output, an ampere-seconds meter comprising a damped direct current meter with negligible restoring force to which the rectified output from the amplifier is supplied, and a time switch comprising a cam, means for rotating the cam at a constant speed, a first set of contacts operated by the cam at the beginning of its movement for rendering the meter responsive to the output from the pick-up, a second set of contacts operated by the cam at the end of its movement for rendering the meter unresponsive to the output from the pick-up, means for starting rotation of the cam and means for stopping the cam after a predetermined movement.

18. Apparatus for measuring the average roughness of a surface comprising the combination of a stylus for engaging the surface, an electrical pick-up carrying the stylus and having an electrical output which varies in accordance with movements of the stylus substantially normal to the surface, means for traversing the pick-up across the surface, an amplifier for the output of the pick-up, means for rectifying the output of the amplifier, an ampere-seconds meter comprising a damped D. C. meter with negligible restoring force, means for connecting the pick-up to the amplifier input circuit and the meter to the rectifying means and a time switch comprising a cam, means for rotating the cam at a constant speed, a first set of contacts operated by the cam at the beginning of its movement for rendering the meter responsive to the output from the pick-up, a second set of contacts operated by the cam at the end of its movement for rendering the meter unresponsive to the output from the pick-up, means for starting rotation of the cam and means for stopping the cam after a predetermined movement.

19. Apparatus as claimed in claim 16, in which the first set of contacts are normally closed to supply zeroizing reverse current to the meter but are opened during the initial movement of the cam while the second pair of contacts are normally open and are closed to short-circuit the meter at the end of the movement of the cam.

20. Apparatus as claimed in claim 18, in which the first set of contacts are normally closed to supply zeroizing reverse current to the meter but are opened during the initial movement of the cam while the second pair of contacts are normally open and are closed to short-circuit the meter at the end of the movement of the cam.

RICHARD EDMUND REASON.
RAYMOND IVAN GARROD.